United States Patent
Hu et al.

(10) Patent No.: US 11,866,364 B2
(45) Date of Patent: Jan. 9, 2024

(54) SALT BATH FOR GLASS REINFORCEMENT, PREPARATION METHOD THEREFOR, REINFORCED GLASS AND GLASS RAW MATERIAL

(71) Applicant: Chongqing Aureavia Hi-tech Glass Co., Ltd., Chongqing (CN)

(72) Inventors: Wei Hu, Guangdong (CN); Baoquan Tan, Guangdong (CN); Xuming Liu, Guangdong (CN)

(73) Assignee: Chongqing Aureavia Hi-tech Glass Co., Ltd., Chongqing (CN)

( * ) Notice: Subject to any disclaimer, the term of this patent is extended or adjusted under 35 U.S.C. 154(b) by 1020 days.

(21) Appl. No.: 16/968,871

(22) PCT Filed: Jan. 31, 2018

(86) PCT No.: PCT/CN2018/074633
§ 371 (c)(1),
(2) Date: Aug. 11, 2020

(87) PCT Pub. No.: WO2019/000942
PCT Pub. Date: Jan. 3, 2019

(65) Prior Publication Data
US 2021/0094871 A1   Apr. 1, 2021

(30) Foreign Application Priority Data

Jun. 29, 2017   (CN) .......................... 201710515278.6

(51) Int. Cl.
| C03C 21/00 | (2006.01) |
| C03C 3/085 | (2006.01) |
| C03C 3/087 | (2006.01) |
| C03C 3/093 | (2006.01) |
| C03C 3/097 | (2006.01) |
| C03C 4/18 | (2006.01) |

(52) U.S. Cl.
CPC ............ *C03C 21/002* (2013.01); *C03C 3/085* (2013.01); *C03C 3/087* (2013.01); *C03C 3/093* (2013.01); *C03C 3/097* (2013.01); *C03C 4/18* (2013.01); *C03C 2204/00* (2013.01)

(58) Field of Classification Search
CPC ........................... C03C 21/001; C03C 21/002
See application file for complete search history.

(56) References Cited

U.S. PATENT DOCUMENTS

| 3,844,754 | A | * | 10/1974 | Grubb | .................. | C03C 21/002 |
| | | | | | | 65/30.14 |
| 4,021,218 | A | * | 5/1977 | Watanabe | ............... | C03C 17/23 |
| | | | | | | 427/253 |
| 2019/0112220 | A1 | * | 4/2019 | Alder | .................... | C03C 21/002 |

FOREIGN PATENT DOCUMENTS

| CN | 101648776 A | 2/2010 |
| CN | 102092940 A | 6/2011 |
| CN | 102951850 A | 3/2013 |
| CN | 103819079 A | 5/2014 |
| CN | 104743866 A | 7/2015 |
| CN | 105829257 A | 8/2016 |
| CN | 105837036 A | 8/2016 |

OTHER PUBLICATIONS

International Search Report of PCT Patent Application No. PCT/CN2018/074633 dated May 3, 2018.

* cited by examiner

*Primary Examiner* — Cynthia Szewczyk

(57) ABSTRACT

A salt bath for glass reinforcement, including a nitrate and a metal compound. The mass fraction of the nitrate is not less than 50%, and the nitrate is in a molten state. The metal compound is fused into the nitrate, and the metal compound contains the same metal element as the nitrate. The mass fraction of the metal element in the molecular formula corresponding to the metal compound is greater than the mass fraction in the molecular formula corresponding to the nitrate. Thus, compared with the existing salt bath, under the condition of the same mass, the salt bath can provide more effective amount of metal ions, thereby increasing the strength of glass after reinforcement, and at the same time, the lifetime of the salt bath is increased, reducing the waste of resources and environmental pollution.

18 Claims, No Drawings

SALT BATH FOR GLASS REINFORCEMENT, PREPARATION METHOD THEREFOR, REINFORCED GLASS AND GLASS RAW MATERIAL

TECHNICAL FIELD

The present disclosure relates generally to glass chemical reinforcement field, and more particularly relates to a salt bath for glass reinforcement, a preparation method therefor, a reinforced glass and a glass raw material.

BACKGROUND

At present, the ultra-thin glass with thickness less than 2 mm and the glass with ultra-high strength requirements need to be chemically reinforced by an ion-substitution method which includes steps of placing the glass into the ion-substitution salt bath, and substituting the smaller ions in the glass with the larger ions in the salt bath. Generally, the ions involved in the substitution are alkali metal ions.

The salt bath required for ion substitution is limited by the substitution temperature of the glass ion, which is generally between 380-450° C., so there are many restrictions on the compound salt that can be used in the salt bath. The alkali metal nitrate with a low melting point is usually used. When a certain nitrate is determined, under the same mass, the number of effective metal ions that can participate in the ion substitution is also determined. In other words, the number of effective metal ions in the salt bath is determined by the certain salt which has been used.

The surface compressive stress of the chemically reinforced glass during the ion substitution is determined by the absolute number of the effective metal ions in the salt bath. Generally speaking, the more the effective metal ions, the higher the surface compressive stress which can be produced on the glass surface, as well as the glass strength. However, all salt baths can only use nitrates without exception. The capacity of the nitrates for providing the effective metal ions has become the strength ceiling of the reinforced glass. Some existing literatures have also mentioned that additives can be added in the salt bath. However, most of these additives cannot be dissolved or melted in the nitrate bath. In other words, these additives cannot effectively be ionized in nitrate bath and participate in the ion substitution of the glass. At best, they can only have functions of physical or chemical adsorption of some components in salt bath, destruction or protection of the glass structure. Therefore, it is necessary to study and optimize the salt bath for further improving the ability of the salt bath to provide effective metal ions, thus improving the strength of glass after the reinforcement. At the same time, the quantity increase of the effective metal ions is equivalent to the increase of the service life of the salt bath, thus reducing waste and pollution.

Therefore, it is necessary to design a new salt bath for glass reinforcement to overcome the above problems.

SUMMARY

The object of the present application is to provide a new salt bath for glass reinforcement which is capable of improving the ability of the salt bath to provide effective metal ions, thus improving the strength of glass after the reinforcement, aiming at the above problem of the prior art that the ability of the salt bath for glass reinforcement to provide effective metal ions is difficult to be improved due to the limitations of the nitrate type.

In a first aspect, a salt bath for glass reinforcement is provided, which including a nitrate with a mass fraction not less than 50% in a molten state, and a metal compound fused into the nitrate, wherein the metal compound contains a same metal element as the nitrate, wherein a mass fraction of the metal element in a molecular formula corresponding to the metal compound is greater than a mass fraction of the metal element in a molecular formula corresponding to the nitrate.

Advantageously, the salt bath for glass reinforcement includes a variety of nitrates and a variety of metal compounds, wherein the variety of nitrates contains same types of the metal element as the variety of metal compounds; and wherein for a same type of the metal element, a mass fraction of the metal element in the molecular formula corresponding to the metal compound is greater than a mass fraction of the metal element in the molecular formula corresponding to the nitrate.

Advantageously, the metal compound is selected from at least one of: a metal chloride, a metal peroxide, a metal oxide, a metal phosphate, a metal carbonate, a metal bicarbonate, a metal silicate and a metal hydroxide.

Advantageously, a mass fraction of the metal chloride, metal peroxide, metal oxide, metal phosphate, metal carbonate, metal bicarbonate or metal silicate is greater than 0.1% but smaller than 30%.

Advantageously, the mass fraction of the metal hydroxides is greater than 0.1% but smaller than 10%.

Advantageously, the metal element is selected from a first main group element and a second main group element in an element periodic table.

Advantageously, the salt bath for glass reinforcement further includes an additive that is not fused in the nitrate.

In a second aspect, a preparation method for the above salt bath for glass reinforcement is provided, which including following steps:
  adding a solid nitrate to a container;
  heating the container until the nitrate is completely melted;
  adding a metal compound to the nitrate, wherein added metal compound contains a same metal element as the nitrate, wherein a mass fraction of the metal element in a molecular formula corresponding to the metal compound is greater than a mass fraction of the metal element in a molecular formula corresponding to the nitrate, and the added metal compound has a mass less than or equal to that of the nitrate;
  heating the container and stirring the nitrate until the metal compound is completely melted in the nitrate to obtaining a required salt bath.

Correspondingly, in a third aspect, a further preparation method for the above salt bath for glass reinforcement is provided, which including following steps:
  weighing a solid nitrate and a solid metal compound and mixing both equably to obtain a mixed salt, wherein the metal compound and the nitrate contains a same metal element, wherein a mass fraction of the metal element in a molecular formula corresponding to the metal compound is greater than a mass fraction of the metal element in a molecular formula corresponding to the nitrate, and the metal compound has a mass less than or equal to that of the nitrate;
  adding the mixed salt into a container;
  heating the container until the mixed salt is completely melted to obtain a required salt bath.

In a fourth aspect, a reinforced glass is provided, wherein the reinforced glass is prepared by one or more times of ion substitution of a glass to be reinforced with the salt bath discussed above.

Advantageously, when a total ion substitution depth DOL of the reinforced glass is greater than 30 μm, a surface compressive stress CS of the reinforced glass is greater than 750 MPa.

Advantageously, the reinforced glass is prepared by multiple times of ion substitution of the glass to be reinforced with the salt bath, wherein a surface compressive stress at an inflexion on a stress fitting curve CS_TP of the reinforced glass is greater than 90 Mpa.

Advantageously, the surface compressive stress at the inflexion on the stress fitting curve CS_TP of the reinforced glass is greater than 100 Mpa.

In a fifth aspect, a glass raw material is provided, wherein the glass raw material is transformed into the reinforced glass discussed above after one or more times of ion substitution of a glass to be reinforced with the salt bath discussed above.

Advantageously, the glass raw material includes an alkali metal oxide, an oxide of a third main group element, an oxide of a fourth main group element, and at least one of: an alkali earth metal oxide and an oxide of a fifth main group element; wherein a mole percentage of the alkali metal oxide is 10-25%, and the alkali metal oxide includes at least one of: a lithium oxide, a sodium oxide, a potassium oxide and a rubidium oxide.

Advantageously, the glass raw material further includes an alkaline earth metal oxide having a mole percentage less than 10%.

Advantageously, the alkali metal oxide includes one of a sodium oxide or a lithium oxide having a mole percentage less than 22%.

Advantageously, the alkali metal oxide includes a sodium oxide and a lithium oxide with a total mole percentage less than 22%.

Advantageously, the alkali metal oxide includes a potassium oxide, and a ratio of a mole percentage of the potassium oxide over a mole percentage of the alkali metal oxide is smaller than 0.25.

Advantageously, the alkaline earth metal oxide includes a magnesium oxide, and a ratio of a mole percentage of the magnesium oxide over the mole percentage of the alkaline earth metal oxide is between 0.3-1.

Advantageously, the glass raw material includes an oxide of a fifth main group element, wherein the oxide of a third main group element includes an alumina oxide and a boron oxide, the oxide of a fourth main group element includes a silicon oxide, the oxide of a fifth main group element includes a phosphorus oxide and a bismuth oxide, wherein a ratio of a total mole percentage of the silicon oxide, the alumina oxide, the boron oxide, the magnesium oxide, the phosphorus oxide and the bismuth oxide over the alkali metal oxide is between 3-7.

Advantageously, the oxide of a third main group element includes an alumina oxide, the oxide of a fourth main group element includes a silicon oxide, wherein a ratio of a total mole percentage of the silicon oxide and the alumina oxide over the alkali metal oxide is between 3-6.5.

Advantageously, the glass raw material includes an oxide of a fifth main group element, wherein a ratio of a total mole percentage of the oxide of a third main group element, the oxide of a fourth main group element and the oxide of a fifth main group element over the alkali metal oxide is greater than 3.1 but smaller than 6.8.

Advantageously, the glass raw material does not include an oxide of a fifth main group element, wherein a ratio of a total mole percentage of the oxide of a third main group element and the oxide of a fourth main group element over the alkali metal oxide is greater than 3.1 but smaller than 6.8.

Advantageously, the glass raw material further includes an component with a mole percentage less than or equal to 3% other than the alkali metal oxide, the alkali earth metal oxide, the oxide of a third main group element, the oxide of a fourth main group element and the oxide of a fifth main group element.

Advantageously, the glass raw material includes in a mole percentage:

$Na_2O$: 4~22%;
MgO: 0~9.5%;
$Al_2O_3$: 5.5~18.5%;
$SiO_2$: 52~75%;
$K_2O$: 0~7%;
CaO: 0~1.5%;
$SnO_2$: 0~1.5%;
$Sb_2O_3$: 0~0.5%;
$B_2O_3$: 0~7%;
$P_2O_5$: 0~8.5%;
ZnO: 0~2%;
$Li_2O$: 0~22%;
$ZrO_2$: 0~3%;
$Fe_2O_3$: 0~0.5%;
SrO: 0~0.5%;
BaO: 0~0.5%;
$Bi_2O_3$: 0~1.5%;
$TiO_2$: 0~3%.

The salt bath for glass reinforcement provided by the present application has the following beneficial effects. The salt bath for glass reinforcement includes nitrate and metal compound a nitrate with a mass fraction not less than 50% in a molten state, and a metal compound fused into the nitrate, wherein the metal compound contains a same metal element as the nitrate, wherein a mass fraction of the metal element in a molecular formula corresponding to the metal compound is greater than a mass fraction of the metal element in a molecular formula corresponding to the nitrate. Thus, compared with the existing salt bath, under the condition of the same mass, the salt bath of the present application can provide more effective metal ions, thereby increasing the strength of the glass after reinforcement, and at the same time, the lifetime of the salt bath is increased, thus reducing the waste of resources and environmental pollution.

DETAILED DESCRIPTION OF THE PREFERRED EMBODIMENT

To make the object, the technical solution, and the advantage of the present application more clearly, the present application is further described in detail below with reference to the accompanying embodiments. Many specific details are set forth in the following description to facilitate a full understanding of the present application. However, the present application can be implemented in many other ways different from those described herein. One skilled in the art can make similar improvements without violating the connotation of the present application. Therefore, the present application is not limited by the specific implementation disclosed below.

The salt bath for glass reinforcement includes nitrate and metal compound a nitrate in a molten state, and a metal compound fused into the nitrate, wherein the metal compound contains a same metal element as the nitrate, wherein a mass fraction of the metal element in a molecular formula corresponding to the metal compound is greater than a mass fraction of the metal element in a molecular formula corresponding to the nitrate. Thus, compared with the pure nitrate salt bath with the same mass, the salt bath of the present application can provide more effective metal ions.

For example, if the $NaNO_3$ is selected as the nitrate, the metal compound must include Na element. In additional, as the Na element in the $NaNO_3$ has a mass fraction of 23/85, the mass fraction of the Na element in the molecular formula corresponding to the metal compound should be greater than 23/85. According to the above description, the metal compound can be one of more of: NaOH, NaCl, $Na_3PO_4$, $Na_2CO_3$, $NaHCO_3$, $Na_2SiO_3$, $Na_2O$ or $Na_2O_2$.

For example, if the $KNO_3$ is selected as the nitrate, the metal compound must include K element. In additional, as the K element in the $KNO_3$ has a mass fraction of 39/101, the mass fraction of the K element in the molecular formula corresponding to the metal compound should be greater than 39/101. According to the above description, the metal compound can be one of more of: KOH, KCl, $K_3PO_4$, $K_2CO_3$, $KHCO_3$, $K_2SiO_3$, $K_2O$ or $K_2O_2$.

Furthermore, the salt bath for glass reinforcement provided by the present application can further includes a variety of nitrates, such as $KNO_3$ and $NaNO_3$. Correspondingly, the metal compound can be more than one of: NaOH, NaCl, $Na_3PO_4$, $Na_2CO_3$, $NaHCO_3$, $Na_2SiO_3$, $Na_2O$, $Na_2O_2$, KOH, KCl, $K_3PO_4$, $K_2CO_3$, $KHCO_3$, $K_2SiO_3$, $K_2O$ or $K_2O_2$.

Furthermore, the metal compound can be selected from at least one of: a metal chloride, a metal peroxide, a metal oxide, a metal phosphate, a metal carbonate, a metal bicarbonate, a metal silicate and a metal hydroxide. When the metal compound is selected as the metal chloride, the metal peroxide, the metal oxide, the metal phosphate, the metal carbonate, the metal bicarbonate or the metal silicate, its mass fraction is preferably greater than 0.1% but smaller than 30%, so as to ensure that the metal chloride, metal peroxide, metal oxide, metal phosphate, metal carbonate, metal bicarbonate or metal silicate can be completely melted in the corresponding nitrate to provide more effective metal ions. When the metal compound is selected as the metal hydroxide, its mass fraction is preferably greater than 0.1% but smaller than 10%, so as to ensure that the metal hydroxide can be completely melted in the corresponding nitrate to provide more effective metal ions.

Furthermore, the metal element is selected from the first main group metal elements in the element periodic table, such as Li, Na, K, Rb, CS, etc. The metal elements can also be selected from the second main group elements, such as be, Mg, Ca, Sr, Ba, etc.

Furthermore, the salt bath also includes an additive that is not fused in the nitrate, such as ion sieve ceramics, diatomite, alumina, pyroantimonate (Shenzhen Lifeng Industry Co., Ltd, Potassium Treasure™), etc. The additive which is not fused in the salt bath absorbs the small ions released in the ion-substitution of the glass in the salt bath by physical and chemical reactions, so as to reduce the interference of the small ions on the normal ion substitution reactions and increase the reaction rate of the ion-substitution in a signal direction of substituting the smaller ions with the large ions, thus extending the service life of salt bath or enhancing the reinforcement ability of salt bath within the range of effective ions inherent in the salt bath, without increasing the absolute number of effective ions in the salt bath, nor producing essential changes to the salt bath and ion substitution.

The present application has provided a preparation method for the above salt bath for glass reinforcement, including following steps: adding a solid nitrate to a container; heating the container until the nitrate is completely melted; adding a metal compound to the nitrate, wherein added metal compound contains a same metal element as the nitrate, wherein a mass fraction of the metal element in a molecular formula corresponding to the metal compound is greater than a mass fraction of the metal element in a molecular formula corresponding to the nitrate, and the added metal compound has a mass less than or equal to that of the nitrate; heating the container and stirring the nitrate until the metal compound is completely melted in the nitrate to obtaining a required salt bath.

The present application has provided a further preparation method for the above salt bath for glass reinforcement, including following steps: weighing a solid nitrate and a solid metal compound and mixing both equably to obtain a mixed salt, wherein the metal compound and the nitrate contains a same metal element, wherein a mass fraction of the metal element in a molecular formula corresponding to the metal compound is greater than a mass fraction of the metal element in a molecular formula corresponding to the nitrate, and the metal compound has a mass less than or equal to that of the nitrate; adding the mixed salt into a container; heating the container until the mixed salt is completely melted to obtain a required salt bath.

The present application has further provided a reinforced glass which is prepared by one or more times of ion substitution of a glass to be reinforced with the salt bath discussed above.

Furthermore, when a total ion substitution depth DOL of the reinforced glass is greater than 30 μm, a surface compressive stress CS of the reinforced glass is greater than 750 MPa. Advantageously, the surface compressive stress CS of the reinforced glass is greater than 800 MPa.

Furthermore, the reinforced glass is prepared by multiple times of ion substitution of the glass to be reinforced with the salt bath, wherein a surface compressive stress at an inflexion on a stress fitting curve CS_TP of the reinforced glass is greater than 90 Mpa. Advantageously, the surface compressive stress at the inflexion on the stress fitting curve CS_TP of the reinforced glass is greater than 100 Mpa.

The present application has further provided a glass raw material which is particularly suitable for the above discussed salt bath, that is, under the same conditions, the obtained glass after one or more times of ion substitution from the glass raw material has superior characteristics compared with other glasses, and the above discussed reinforced glass can be obtained by the glass raw material after one or more times of ion substitution with the above discussed salt bath.

Furthermore, the glass raw material includes an alkali metal oxide, an oxide of a third main group element and an oxide of a fourth main group element, and at least one of an alkali earth metal oxide and an oxide of a fifth main group element, wherein a mole percentage of the alkali metal oxide is between 10-25%, and the alkali metal oxide includes at least one of: a lithium oxide, a sodium oxide, a potassium oxide and a rubidium oxidation. In additional, when the glass raw material includes an alkaline earth metal oxide, the mole percentage of the alkaline earth metal oxide is less than 10%.

Furthermore, when the alkali metal oxide includes the sodium oxide rather than the lithium oxide, the mole percentage of the sodium oxide is less than 22%. When the alkali metal oxide includes the lithium oxide rather than the sodium oxide, the mole percentage of lithium oxide is less than 22%. When the alkali metal oxide includes both of the sodium oxide and the lithium oxide, the total mole percentage of the sodium oxide and lithium oxide is less than 22%.

Furthermore, when the alkali metal oxide includes the potassium oxide, the mole percentage of the potassium oxide is configured to have a ratio less than 0.25 over the mole percentage of the alkali metal oxide.

Furthermore, when the glass raw material includes the alkaline earth metal oxide including the magnesium oxide, the mole percentage of the magnesium oxide is configured as a ratio between 0.3-1 over the mole percentage of the alkaline earth metal oxide.

Furthermore, when the glass raw material includes an oxide of a fifth main group element, the oxide of a third main group element includes an alumina oxide and a boron oxide, the oxide of a fourth main group element includes a silicon oxide, the oxide of a fifth main group element includes a phosphorus oxide and a bismuth oxide, a ratio of a total mole percentage of the silicon oxide, the alumina oxide, the boron oxide, the magnesium oxide, the phosphorus oxide and the bismuth oxide over the alkali metal oxide is between 3-7.

Furthermore, when the oxide of a third main group element includes an alumina oxide, the oxide of a fourth main group element includes a silicon oxide, a ratio of a total mole percentage of the silicon oxide and the alumina oxide over the alkali metal oxide is between 3-6.5.

Furthermore, when the glass raw material includes an oxide of a fifth main group element, wherein a ratio of a total mole percentage of the oxide of a third main group element, the oxide of a fourth main group element and the oxide of a fifth main group element over the alkali metal oxide is greater than 3.1 but smaller than 6.8.

Furthermore, when the glass raw material does not include an oxide of a fifth main group element, wherein a ratio of a total mole percentage of the oxide of a third main group element and the oxide of a fourth main group element over the alkali metal oxide is greater than 3.1 but smaller than 6.8.

Furthermore, the glass raw material further includes an component with a mole percentage less than or equal to 3% other than the alkali metal oxide, the alkali earth metal oxide, the oxide of a third main group element, the oxide of a fourth main group element and the oxide of a fifth main group element.

Advantageously, the glass raw material includes in a mole percentage:

$Na_2O$: 4~22%;
MgO: 0~9.5%;
$Al_2O_3$: 5.5~18.5%;
$SiO_2$: 52~75%;
$K_2O$: 0~7%;
CaO: 0~1.5%;
$SnO_2$: 0~1.5%;
$Sb_2O_3$: 0~0.5%;
$B_2O_3$: 0~7%;
$P_2O_5$: 0~8.5%;
ZnO: 0~2%;
$Li_2O$: 0~22%;
$ZrO_2$: 0~3%;
$Fe_2O_3$: 0~0.5%;
SrO: 0~0.5%;
BaO: 0~0.5%;
$Bi_2O_3$: 0~1.5%;
$TiO_2$: 0~3%.

The following examples list the components and contents of several kinds of the glass raw material:

| Component | Glass raw material 1 | | Glass raw material 2 | | Glass raw material 3 | | Glass raw material 4 | |
|---|---|---|---|---|---|---|---|---|
| | mol | mol % | mol | mol % | mol | mol % | mol | mol % |
| $Na_2O$ | 18.55 | 12.00% | 28.40 | 18.42% | 22.59 | 14.15% | 24.36 | 16.35% |
| MgO | 7.44 | 4.81% | 5.09 | 3.30% | 11.41 | 7.15% | 6.95 | 4.66% |
| $Al_2O_3$ | 16.67 | 10.78% | 13.63 | 8.84% | 17.16 | 10.75% | 17.95 | 12.04% |
| $SiO_2$ | 103.19 | 66.73% | 97.37 | 63.16% | 107.35 | 67.25% | 97.53 | 65.45% |
| $K_2O$ | 1.06 | 0.69% | 5.63 | 3.65% | 0.00 | 0.00% | 0.00 | 0.00% |
| CaO | 0.00 | 0.00% | 1.19 | 0.78% | 0.00 | 0.00% | 0.05 | 0.04% |
| $SnO_2$ | 0.20 | 0.13% | 0.02 | 0.01% | 0.00 | 0.00% | 0.24 | 0.16% |
| $Sb_2O_3$ | 0.00 | 0.00% | 0.00 | 0.00% | 0.00 | 0.00% | 0.00 | 0.00% |
| $B_2O_3$ | 6.03 | 3.90% | 0.00 | 0.00% | 0.00 | 0.00% | 0.75 | 0.50% |
| $P_2O_5$ | 0.00 | 0.00% | 2.00 | 1.30% | 0.00 | 0.00% | 0.00 | 0.00% |
| ZnO | 0.50 | 0.32% | 0.05 | 0.03% | 0.00 | 0.00% | 0.04 | 0.02% |
| $Li_2O$ | 0.00 | 0.00% | 0.00 | 0.00% | 0.50 | 0.31% | 0.00 | 0.00% |
| $ZrO_2$ | 0.49 | 0.31% | 0.65 | 0.42% | 0.24 | 0.15% | 0.16 | 0.11% |
| $Fe_2O_3$ | 0.00 | 0.00% | 0.01 | 0.01% | 0.00 | 0.00% | 0.02 | 0.01% |
| SrO | 0.00 | 0.00% | 0.00 | 0.00% | 0.00 | 0.00% | 0.00 | 0.00% |
| BaO | 0.00 | 0.00% | 0.00 | 0.00% | 0.00 | 0.00% | 0.00 | 0.00% |
| $Bi_2O_3$ | 0.00 | 0.00% | 0.10 | 0.06% | 0.00 | 0.00% | 0.98 | 0.66% |
| $TiO_2$ | 0.50 | 0.32% | 0.03 | 0.02% | 0.38 | 0.24% | 0.00 | 0.00% |
| Total | 154.64 | 100.00% | 154.16 | 100.00% | 159.64 | 100.00% | 149.03 | 100.00% |

| Component | Glass raw material 5 | | Glass raw material 6 | | Glass raw material 7 | |
|---|---|---|---|---|---|---|
| | mol | mol % | mol | mol % | mol | mol % |
| $Na_2O$ | 11.29 | 7.64% | 7.26 | 4.56% | 12.91 | 8.21% |
| MgO | 7.44 | 5.03% | 10.17 | 6.39% | 0.02 | 0.02% |
| $Al_2O_3$ | 13.63 | 9.22% | 12.55 | 7.88% | 22.80 | 14.51% |
| $SiO_2$ | 92.87 | 62.81% | 113.18 | 71.07% | 92.54 | 58.89% |

-continued

| | | | | | | |
|---|---|---|---|---|---|---|
| $K_2O$ | 0.00 | 0.00% | 0.01 | 0.01% | 0.00 | 0.00% |
| CaO | 0.00 | 0.00% | 0.02 | 0.01% | 0.02 | 0.01% |
| $SnO_2$ | 0.12 | 0.08% | 0.01 | 0.01% | 0.07 | 0.05% |
| $Sb_2O_3$ | 0.00 | 0.00% | 0.00 | 0.00% | 0.00 | 0.00% |
| $B_2O_3$ | 1.72 | 1.17% | 0.00 | 0.00% | 0.00 | 0.00% |
| $P_2O_5$ | 1.00 | 0.68% | 0.00 | 0.00% | 3.75 | 2.39% |
| ZnO | 1.57 | 1.06% | 0.00 | 0.00% | 1.54 | 0.98% |
| $Li_2O$ | 16.73 | 11.32% | 13.05 | 8.20% | 23.43 | 14.91% |
| $ZrO_2$ | 1.46 | 0.99% | 1.48 | 0.93% | 0.02 | 0.01% |
| $Fe_2O_3$ | 0.00 | 0.00% | 0.01 | 0.01% | 0.01 | 0.00% |
| SrO | 0.00 | 0.00% | 0.01 | 0.01% | 0.01 | 0.01% |
| BaO | 0.00 | 0.00% | 0.00 | 0.00% | 0.01 | 0.00% |
| $Bi_2O_3$ | 0.00 | 0.00% | 1.50 | 0.94% | 0.00 | 0.00% |
| $TiO_2$ | 0.00 | 0.00% | 0.00 | 0.00% | 0.01 | 0.01% |
| Total | 147.85 | 100.00% | 159.26 | 100.00% | 157.13 | 100.00% |

The inventor has found that compared with other glasses, the glass obtained after one or more times of ion substitution with the salt bath discussed above from the seven kinds of glass raw material listed above has more superior characteristics. Of course, the glass raw materials provided by the present application are not limited to the seven kinds listed above.

The present application will be further described in the following embodiments.

Embodiment 1

This embodiment provides salt bath A, salt bath B and salt bath C for glass reinforcement, wherein the components and contents of the salt bath A, salt bath B and salt bath C are shown in Table 1-1 below. For comparison, table 1 also provides the components and contents of salt bath D commonly used in the prior art.

TABLE 1-1

Components and mass fraction (%) for each component of salt bath A, B, C and D

| Type | Component | | | | |
|---|---|---|---|---|---|
| | $KNO_3$ | KCl | $K_2O$ | $K_2O_2$ | KOH |
| Salt bath A | 89.00 | 11.00 | 0 | 0 | 0 |
| Salt bath B | 86.70 | 9.10 | 1.90 | 2.30 | 0 |
| Salt bath C | 87.50 | 3.80 | 3.80 | 4.40 | 0.60 |
| Salt bath D | 100 | 0 | 0 | 0 | 0 |

The preparation method of salt bath A is as follows. 89 parts by mass of solid $KNO_3$ and 11 parts by mass of solid KCl are weighed at first. Then the weighed solid $KNO_3$ are transferred to a container with good thermal conductivity and high temperature resistance which is heated until the solid $KNO_3$ in the container is completely transformed into a molten state. After that, the weighed solid KCl is transferred into the container which is continuously heated. The $KNO_3$ in the molten state in the container is stirred until the added solid KCl is completely melted in the $KNO_3$ in the molten state thus obtaining the salt bath A.

Of course, in other embodiment, the following method can also be employed for the preparation of the salt bath A. Firstly, 89 parts by mass of solid $KNO_3$ and 11 parts by mass of solid KCl are weighed and mixed equably to obtain mixed salts. Then the mixed salts are transferred to a container with good thermal conductivity and high temperature resistance which is heated until the solid $KNO_3$ and solid KCl in the container are completely transformed into a molten state, thus obtaining the salt bath A.

The preparation method of salt bath B is as follows. 86.7 parts by mass of solid $KNO_3$, 9.1 parts by mass of solid KCl, 1.9 parts by mass of solid $K_2O$ and 2.3 parts by mass of solid $K_2O_2$ are weighed at first. Then the weighed solid $KNO_3$ are transferred to a container with good thermal conductivity and high temperature resistance which is heated until the solid $KNO_3$ in the container is completely transformed into a molten state. After that, the weighed solid KCl, solid $K_2O$ and solid $K_2O_2$ are transferred into the container which is continuously heated. The $KNO_3$ in the molten state in the container is stirred until the added solid KCl, solid $K_2O$ and solid $K_2O_2$ are completely melted in the $KNO_3$ in the molten state thus obtaining the salt bath B.

Of course, in other embodiment, the following method can also be employed for the preparation of the salt bath B. Firstly, 86.7 parts by mass of solid $KNO_3$, 9.1 parts by mass of solid KCl, 1.9 parts by mass of solid $K_2O$ and 2.3 parts by mass of solid $K_2O_2$ are weighed and mixed equably to obtain mixed salts. Then the mixed salts are transferred to a container with good thermal conductivity and high temperature resistance which is heated until the solid $KNO_3$, solid KCl, solid $K_2O$ and solid $K_2O_2$ in the container are completely transformed into a molten state, thus obtaining the salt bath B.

The preparation method of salt bath C is as follows. 87.5 parts by mass of solid $KNO_3$, 3.8 parts by mass of solid KCl, 3.8 parts by mass of solid $K_2O$, 4.4 parts by mass of solid $K_2O_2$ and 0.6 parts by mass of solid KOH are weighed at first. Then the weighed solid $KNO_3$ are transferred to a container with good thermal conductivity and high temperature resistance which is heated until the solid $KNO_3$ in the container is completely transformed into a molten state. After that, the weighed solid KCl, solid $K_2O$, solid $K_2O_2$ and solid KOH are transferred into the container which is continuously heated. The $KNO_3$ in the molten state in the container is stirred until the added solid KCl, solid $K_2O$, solid $K_2O_2$ and solid KOH are completely melted in the $KNO_3$ in the molten state thus obtaining the salt bath C.

Of course, in other embodiment, the following method can also be employed for the preparation of the salt bath C. Firstly, 87.5 parts by mass of solid $KNO_3$, 3.8 parts by mass of solid KCl, 3.8 parts by mass of solid $K_2O$, 4.4 parts by mass of solid $K_2O_2$ and 0.6 parts by mass of solid KOH are weighed and mixed equably to obtain mixed salts. Then the mixed salts are transferred to a container with good thermal conductivity and high temperature resistance which is heated until the solid $KNO_3$, solid KCl, solid $K_2O$, solid $K_2O_2$ and KOH in the container are completely transformed into a molten state, thus obtaining the salt bath C.

The preparation method of salt bath D is as follows. 100 parts by mass of solid $KNO_3$ is weighed and then transferred to a container with good thermal conductivity and high temperature resistance which is heated until the solid $KNO_3$ in the container is completely transformed into a molten state, thus obtaining the salt bath D.

The present embodiment has provided a glass raw material A having a thickness of 0.65 mm, and the components and their contents of the glass raw material A are shown in table 1-2.

TABLE 1-2

Composition table of glass raw material A

| Composition | Mass fraction | Molecular weight | Mole number | Mole fraction |
|---|---|---|---|---|
| $SiO_2$ | 62.00% | 60.08 | 103.19 | 67.19% |
| $Al_2O_3$ | 17.00% | 101.96 | 16.67 | 10.86% |
| $B_2O_3$ | 4.20% | 69.62 | 6.03 | 3.93% |
| MgO | 3.00% | 40.30 | 7.44 | 4.85% |
| $Na_2O$ | 10.50% | 61.98 | 16.94 | 11.03% |
| $K_2O$ | 2.00% | 94.20 | 2.12 | 1.38% |
| $TiO_2$ | 0.40% | 79.87 | 0.50 | 0.33% |
| $ZrO_2$ | 0.60% | 123.22 | 0.49 | 0.32% |
| $SnO_2$ | 0.30% | 150.60 | 0.20 | 0.13% |
| Total | 100.00% | 781.82 | 153.59 | 100.00% |

In the present embodiment, the glass raw material A has gone through a single time of ion substitution in the salt bath A, salt bath B, salt bath C and salt bath D, respectively. The surface compressive stress CS and ion substitution depth DOL of the reinforced glass obtained from the glass raw material A after the single time of ion substitution in the salt bath A, salt bath B, salt bath C and salt bath D under different temperature and time period conditions are measured by FSM 6000 surface stress meter (ORIHARA), and the test results are shown in table 1-3.

TABLE 1-3 surface compressive stress CS and ion substitution depth DOL of the reinforced glass obtained from the glass raw material A after single time of ion substitution in different salt baths under different temperature and time period conditions

| | | Time period of ion substitution | | | | | |
|---|---|---|---|---|---|---|---|
| | | 2 h | | 4 h | | 6 h | |
| Type of salt bath | Temperature of Salt bath | CS/Mpa | DOL/μm | CS/Mpa | DOL/μm | CS/Mpa | DOL/μm |
| Salt bath D | 390° C. | 865.46 | 18.92 | 830.39 | 26.10 | 798.45 | 31.84 |
| | 410° C. | 828.66 | 24.51 | 787.96 | 33.34 | 764.59 | 40.46 |
| | 430° C. | 782.30 | 30.79 | 739.16 | 42.05 | 694.21 | 50.81 |
| Salt bath A | 390° C. | 931.10 | 19.22 | 893.44 | 26.52 | 869.29 | 32.35 |
| | 410° C. | 891.85 | 24.63 | 847.69 | 33.51 | 822.92 | 40.66 |
| | 430° C. | 841.90 | 31.28 | 795.76 | 42.72 | 747.05 | 51.62 |
| Salt bath B | 390° C. | 956.78 | 19.31 | 918.32 | 26.65 | 894.09 | 32.15 |
| | 410° C. | 916.13 | 25.03 | 871.55 | 34.04 | 845.85 | 41.31 |
| | 430° C. | 865.33 | 31.78 | 817.90 | 43.40 | 768.46 | 52.54 |
| Salt bath C | 390° C. | 977.64 | 19.63 | 938.11 | 27.08 | 913.47 | 33.03 |
| | 410° C. | 936.61 | 25.43 | 890.84 | 34.59 | 864.43 | 41.97 |
| | 430° C. | 884.13 | 31.94 | 835.71 | 43.62 | 785.62 | 52.71 |

It can be seen from table 1-3 that under the same temperature of salt bath and the same time period of ion substitution, the surface compressive stress CS value and the ion substitution depth DOL of the reinforced glass obtained from the glass raw material A after the single time of ion substitution in the salt bath D are far less than the surface compressive stress CS value and the ion substitution depth DOL of the reinforced glass obtained from the glass raw material A after the single time of ion substitution in the salt bath A, salt bath B and salt bath C. Therefore, compared with the pure potassium nitrate salt bath of equal quality, the mixed nitrate salt bath with the potassium compound whose mass fraction of the potassium element is greater than 39/101, such as KCl, $K_2O$, $K_2O$ or KOH can play a better role in the reinforcement of the glass raw material A.

In addition, the measurement data in table 1-3 shows that under the condition of the same temperature of salt bath and the same time period of ion substitution, the surface compressive stress CS values and the ion substitution depths DOL of the reinforced glass obtained from the glass raw material A after the single time of ion substitution in the salt bath A, salt bath B and salt bath C show an increasing trend. That is to say, the reinforcement abilities of the salt bath A, salt bath B and salt bath C with the same mass on the glass raw material A are ranked from strong to weak as follows: Salt bath C>Salt bath C>Salt Bath A. It is thus proved that for a mixed nitrate salt bath with the same mass, the larger the mass ratio of the potassium compound whose mass fraction of the potassium element in the mixed nitrate salt bath is greater than 39/101, the stronger the reinforcement ability of the mixed nitrate salt bath on the glass raw material A.

It is worth mentioning that when the ion substitution depths DOL of the reinforced glasses obtained from the glass raw material A after the single time of ion substitution in the salt bath A, salt bath B and salt bath C are greater than 30 μm respectively, the corresponding surface compressive stress CS values can be greater than 800 MPa. Therefore, the advantages of the mixed nitrate salt bath added with the potassium compound whose mass fraction of the potassium element is greater than 39/101 (such as KCl, $K_2O$, $K_2O$ or KOH) compared with the pure nitrate bath with the same mass are further explained.

Embodiment 2

The embodiment provides salt bath E1, salt bath E2, salt bath E3, salt bath E4, salt bath E5, salt bath E6, salt bath F1, salt bath F2, salt bath F3, salt bath F4, salt bath F5 and salt bath F6 for glass reinforcement, and the components and their contents of various salt baths are shown in table 2-1 below. For comparison, table 2-1 also provides the components and their contents of the common salt bath G1, salt bath G2, salt bath G3, salt bath G4, salt bath G 5 and salt bath G6.

TABLE 2-1

Components and mass fraction (%) for each component of salt bath E1, E2, E3, E4, E5, E6, F1, F2, F3, F4, F5, F6, G1, G2, G3, G4, G5, G6

| | Component | | | | | | | |
|---|---|---|---|---|---|---|---|---|
| Type | $Na_2O_2$ | $K_2O_2$ | $Na_2O$ | $K_2O$ | NaCl | KCl | $NaNO_3$ | $KNO_3$ |
| salt bath E1 | 0 | 0 | 0 | 0 | 6.60 | 8.40 | 38.85 | 46.16 |
| salt bath E2 | 0 | 0 | 0 | 0 | 8.11 | 6.89 | 47.43 | 37.57 |

TABLE 2-1-continued

Components and mass fraction (%) for each component of salt bath E1, E2, E3, E4, E5, E6, F1, F2, F3, F4, F5, F6, G1, G2, G3, G4, G5, G6

| Type | Na$_2$O$_2$ | K$_2$O$_2$ | Na$_2$O | K$_2$O | NaCl | KCl | NaNO$_3$ | KNO$_3$ |
|---|---|---|---|---|---|---|---|---|
| salt bath E3 | 0 | 0 | 0 | 0 | 9.70 | 5.30 | 56.32 | 28.68 |
| salt bath E4 | 0 | 0 | 0 | 0 | 11.38 | 3.62 | 65.54 | 19.47 |
| salt bath E5 | 0 | 0 | 0 | 0 | 13.14 | 1.86 | 75.09 | 9.91 |
| salt bath E6 | 0 | 0 | 0 | 0 | 15.00 | 0.00 | 85.00 | 0.00 |
| salt bath F1 | 1.45 | 2.05 | 0.20 | 0.30 | 4.84 | 6.16 | 38.85 | 46.16 |
| salt bath F2 | 1.80 | 1.70 | 0.25 | 0.25 | 5.95 | 5.05 | 47.43 | 37.57 |
| salt bath F3 | 2.18 | 1.32 | 0.30 | 0.20 | 7.12 | 3.88 | 56.32 | 28.68 |
| salt bath F4 | 2.59 | 0.91 | 0.36 | 0.14 | 8.34 | 2.66 | 65.54 | 19.47 |
| salt bath F5 | 3.03 | 0.47 | 0.43 | 0.07 | 9.64 | 1.36 | 75.09 | 9.91 |
| salt bath F6 | 3.50 | 0.00 | 0.50 | 0.00 | 11.00 | 0.00 | 85.00 | 0.00 |
| salt bath G1 | 0 | 0 | 0 | 0 | 0 | 0 | 45.7 | 54.3 |
| salt bath G2 | 0 | 0 | 0 | 0 | 0 | 0 | 55.8 | 44.2 |
| salt bath G3 | 0 | 0 | 0 | 0 | 0 | 0 | 66.26 | 33.74 |
| salt bath G4 | 0 | 0 | 0 | 0 | 0 | 0 | 77.1 | 22.9 |
| salt bath G5 | 0 | 0 | 0 | 0 | 0 | 0 | 88.34 | 11.66 |
| salt bath G6 | 0 | 0 | 0 | 0 | 0 | 0 | 100 | 0 |

In the present embodiment, the salt bath E1, salt bath E2, salt bath E3, salt bath E4, salt bath E5, salt bath E6, salt bath F1, salt bath F2, salt bath F3, salt bath F4, salt bath F5 and salt bath F6 can be prepared according to the related description for each preparation method for the salt bath in the present application, and would not be repeated for concise.

This embodiment also provides a glass raw material B having a thickness of 0.65 mm, and the components and their contents of the glass raw material B are shown in table 2-2.

TABLE 2-2

Composition table of glass raw material B

| Composition | Molecular weight | Mass | Mass fraction | Mole number | Mole fraction |
|---|---|---|---|---|---|
| SiO$_2$ | 60.08 | 55.80 | 61.21% | 92.87 | 62.64% |
| Al$_2$O$_3$ | 101.96 | 13.90 | 15.25% | 13.63 | 9.20% |
| B$_2$O$_3$ | 69.62 | 1.20 | 1.32% | 1.72 | 1.16% |
| Li$_2$O | 29.88 | 5.00 | 5.48% | 16.73 | 11.29% |
| Na$_2$O | 61.98 | 7.00 | 7.68% | 11.29 | 7.62% |
| P$_2$O$_5$ | 141.94 | 2.00 | 2.19% | 1.41 | 0.95% |
| ZnO | 81.38 | 1.28 | 1.40% | 1.57 | 1.06% |
| SnO$_2$ | 150.60 | 0.18 | 0.20% | 0.12 | 0.08% |
| MgO | 40.30 | 3.00 | 3.29% | 7.44 | 5.02% |
| ZrO | 123.22 | 1.80 | 1.97% | 1.46 | 0.99% |
| Total | | 91.16 | 100.00% | 148.26 | 100.00% |

The present embodiment has implemented the experiment one on the glass raw material B.

In the experiment one, the glass raw material B has gone through a first time of ion substitution and ion migration in the salt bath G1, salt bath G2, salt bath G3, salt bath G4, salt bath G5 and salt bath G6 respectively and then a second time of ion substitution in the pure potassium nitrate salt bath.

Among them, the condition of the first time of ion substitution is 420° C., 60 min; the conditions of ion migration is 380° C. and heating in air for 15 min; the condition of the second time of ion substitution is 370° C., 25 min.

Finally, the scattered light photoelasticity (SLP) system (ORIHARA) is used for measuring the first ion substitution data, and the FSM 6000 surface stress meter (ORIHARA) is used for measuring the second ion substitution data, and the final measurement data is shown in table 2-3.

TABLE 2-3

Measurement date of experiment one

| Type of salt bath | Index | | | |
|---|---|---|---|---|
| | CS/Mpa | CS_TP/Mpa | DOL_TP/um | DOL_0/um |
| Salt bath G1 | 873.73 | 110.47 | 10.9 | 113.8 |
| Salt bath G2 | 899.22 | 115.74 | 10.4 | 116.2 |
| Salt bath G3 | 889.60 | 120.16 | 9.5 | 121.4 |
| Salt bath G4 | 864.01 | 131.17 | 9.2 | 113.7 |
| Salt bath G5 | 889.39 | 133.99 | 8.2 | 115.8 |
| Salt bath G6 | 888.63 | 141.43 | 8.1 | 113.4 |

Explanation of Index:
CS: surface compressive stress;
CS_TP: surface compressive stress at the inflexion on the stress fitting curve;
DOL_TP: ion substitution depth at the inflexion on the stress fitting curve;
DOL_0: ion substitution depth at where the surface compressive stress is zero.

The present embodiment has implemented the experiment two on the glass raw material B.

In the experiment two, the glass raw material B has gone through a first time of ion substitution and ion migration in the salt bath E1, salt bath E2, salt bath E3, salt bath E4, salt bath E5 and salt bath E6 respectively and then a second time of ion substitution in the pure potassium nitrate salt bath.

Among them, the condition of the first time of ion substitution is 420° C., 60 min; the conditions of ion migration is 380° C. and heating in air for 15 min; the condition of the second time of ion substitution is 370° C., 25 min.

Finally, the scattered light photoelasticity (SLP) system (ORIHARA) is used for measuring the first ion substitution data, and the FSM 6000 surface stress meter (ORIHARA) is used for measuring the second ion substitution data, and the final measurement data is shown in table 2-4.

TABLE 2-4

Measurement date of experiment two

| Type of salt bat | Index | | | |
|---|---|---|---|---|
| | CS/Mpa | CS_TP/Mpa | DOL_TP/um | DOL_0/um |
| Salt bath E1 | 883.47 | 117.4 | 11.0 | 116.4 |
| Salt bath E2 | 889.22 | 123 | 10.3 | 115.3 |
| Salt bath E3 | 900.49 | 127.7 | 9.6 | 120.7 |
| Salt bath E4 | 853.40 | 139.4 | 9.1 | 121.8 |
| Salt bath E5 | 901.26 | 142.4 | 8.3 | 126.3 |
| Salt bath E6 | 876.77 | 166.5 | 8.0 | 120.9 |

The experiment one and experiment two are compared as follows.

First of all, from table 2-1, it can be seen that the salt bath G1 is a pure nitrate (sodium nitrate+potassium nitrate) salt bath, the total mass fraction of the compounds containing the potassium element in the salt bath E1 is 55.56%, which is roughly the same as the mass fraction of potassium nitrate in the salt bath G1. Similarly, the mass fraction of the compounds containing the sodium element in the salt bath E1 is 45.45%, and correspondingly, it is also roughly the same as the mass fraction of the sodium nitrate in the salt bath G1. However, the difference lies in that the compounds containing the potassium element in the salt bath E1 include not only the potassium nitrate, but also the potassium chloride, and the mass fraction of the potassium element in the molecular formula of the potassium chloride is much greater than that in the molecular formula of the potassium nitrate. In addition, the compounds containing sodium element in salt bath E1 include not only the sodium nitrate, but also the sodium chloride. The mass fraction of the sodium element in the molecular formula of sodium chloride is much greater than that in the molecular formula of the sodium nitrate.

Secondly, by comparing the measurement data in table 2-4 and table 2-3, it can be found that after the salt bath used for the first time of ion substitution of the glass raw material B is changed from the salt bath G1 to the salt bath E1, the CS_TP of the final obtained reinforced glass increases significantly, from 110.47 to 117.4.

Therefore, compared with the pure nitrate (sodium nitrate+potassium nitrate) salt bath with the same mass, the mixed nitrate salt bath added with the potassium compound having the mass fraction of the potassium element that is greater than 39/101, such as KCl, and the potassium compounds having the mass fraction of the sodium element that is greater than 23/85, such as NaCl, can play a better role in the reinforcement of the glass raw material B.

Similarly, by comparing the measurement data in table 2-4 and table 2-3, it can be found that after the salt bath used for the first time of ion substitution of the glass raw material B is changed from the salt bath G2 to the salt bath E2, from the salt bath G3 to the salt bath E3, from the salt bath G4 to the salt bath E4, from the salt bath G5 to the salt bath E5, from the salt bath G6 to the salt bath E6, respectively, the CS_TP of the final obtained reinforced glass increases significantly, from 115.74 to 123, from 120.16 to 127.7, from 131.17 to 139.4, from 133.99 to 142.4, from 141.43 to 166.5, respectively. It can also support the above conclusion.

The present embodiment has implemented the experiment three on the glass raw material B.

In the experiment three, the glass raw material B has gone through a first time of ion substitution and ion migration in the salt bath F1, salt bath F2, salt bath F3, salt bath F4, salt bath F5 and salt bath F6 respectively and then a second time of ion substitution in the pure potassium nitrate salt bath.

Among them, the condition of the first time of ion substitution is 420° C., 60 min; the conditions of ion migration is 380° C. and heating in air for 15 min; the condition of the second time of ion substitution is 370° C., 25 min.

Finally, the scattered light photoelasticity (SLP) system (ORIHARA) is used for measuring the first ion substitution data, and the FSM 6000 surface stress meter (ORIHARA) is used for measuring the second ion substitution data, and the final measurement data is shown in table 2-5.

TABLE 2-5

Measurement date of experiment three

| Type of salt bath | Index | | | |
|---|---|---|---|---|
| | CS/Mpa | CS_TP/Mpa | DOL_TP/um | DOL_0/um |
| Salt bath F1 | 905.31 | 130.43 | 10.9 | 113.8 |
| Salt bath F2 | 898.47 | 136.80 | 10.3 | 114.0 |
| Salt bath F3 | 933.84 | 141.73 | 9.6 | 122.0 |
| Salt bath F4 | 863.99 | 154.71 | 9.2 | 121.8 |
| Salt bath F5 | 934.63 | 157.43 | 8.2 | 125.7 |
| Salt bath F6 | 910.1 | 184.05 | 7.8 | 121.8 |

First of all, from table 2-1, it can be seen that both of the salt bath F1 and the salt bath E1 have the same content of the potassium nitrate and sodium nitrate, and further include the sodium chloride and potassium chloride. The difference lies in that the compounds containing the potassium element in the salt bath F1 include not only the potassium nitrate and potassium chloride, but also the potassium oxide and potassium peroxide. Among them, the mass fraction of the potassium element in the molecular formula of the potassium oxide and potassium peroxide is far greater than the mass fraction of the potassium element in the molecular formula of the potassium chloride. In addition, the compounds containing the sodium element in the salt bath F1 include not only the sodium nitrate and sodium chloride, but also the sodium oxide and sodium peroxide. Among them, the mass fraction of the sodium element in the molecular formula of the sodium oxide and sodium peroxide is far greater than that in the molecular formula of the sodium chloride.

Secondly, by comparing the measurement data in table 2-5 and table 2-4, it can be found that after the salt bath used for the first ion exchange of the glass raw material B is changed from the salt bath E1 to the salt bath F1, the CS_TP of the final obtained reinforced glass increases significantly, from 117.4 to 130.43.

It is shown that the higher the mass fraction of the potassium element in the molecular formula corresponding to the added potassium compound, the greater the improvement on the reinforcement ability of the salt bath under the condition that the same amount of potassium compound and chloride compound are added to the pure nitrate (sodium nitrate+potassium nitrate) salt bath. Similarly, the greater the mass fraction of the chlorine element in the molecular formula corresponding to the added chloride compound, the greater the improvement on the reinforcement ability of the salt bath.

Similarly, by comparing the measurement data in table 2-5 and table 2-4, it can be found that after the salt bath used for the first time of ion substitution of the glass raw material B is changed from the salt bath E2 to the salt bath F2, from the salt bath E3 to the salt bath F3, from the salt bath E4 to the salt bath F4, from the salt bath E5 to the salt bath F5, from the salt bath E6 to the salt bath F6, respectively, the CS_TP of the final obtained reinforced glass increases significantly, from 136.80 to 123, 127.7 to 141.73, 139.4 to 154.71, 142.4 to 157.43, 166.5 to 184.05, respectively. It can also support the above conclusion.

The present embodiment has implemented the experiment four on the glass raw material B.

In the experiment four, the glass raw material B has gone through a first time of ion substitution and ion migration in the salt bath F1, salt bath F2, salt bath F3, salt bath F4, salt bath F5 and salt bath F6 respectively and then a second time of ion substitution in the salt bath H.

Among them, the condition of the first time of ion substitution is 420° C., 60 min; the conditions of ion migration is 380° C. and heating in air for 15 min; the components of the salt bath H and the mass percentage of each component are $KNO_3$: 90%, KCl: 8%, $K_2O$: 2%; the condition of the second time of ion substitution is 370° C., 25 min.

Finally, the scattered light photoelasticity (SLP) system (ORIHARA) is used for measuring the first ion substitution data, and the FSM 6000 surface stress meter (ORIHARA) is used for measuring the second ion substitution data, and the final measurement data is shown in table 2-6.

TABLE 2-6

Measurement date of experiment four

| Type of salt bath | Index | | | |
| --- | --- | --- | --- | --- |
| | CS/Mpa | CS_TP/Mpa | DOL_TP/um | DOL_0/um |
| Salt bath F1 | 986.84 | 136.16 | 11.5 | 114.7 |
| Salt bath F2 | 978.35 | 142.32 | 10.9 | 114.9 |
| Salt bath F3 | 1017.80 | 147.54 | 10.3 | 122.8 |
| Salt bath F4 | 951.65 | 160.67 | 9.9 | 122.6 |
| Salt bath F5 | 1016.94 | 163.46 | 9.3 | 126.6 |
| Salt bath F6 | 991.97 | 189.89 | 9.2 | 121.9 |

The difference between the experiment 4 and experiment 3 lies in that the second time of ion substitution is not in a pure potassium nitrate salt bath, but a mixed salt bath H containing 90% $KNO_3$, 8% KCl and 2% $K_2O$. When the type of the salt bath used in the first time of ion substitution is the same, the CS and CS_TP of the reinforced glass obtained in the experiment four increase greatly compared with the reinforced glass obtained in the experiment three.

It is thus proved that when the glass raw material B is subjected to multiple times of ion substitution, no matter the mixed nitrate salt bath added with potassium compound having the mass fraction of the potassium element that is greater than 39/101, such as KCl, or sodium compound having the mass fraction of the sodium element that is greater than 23/85, such as NaCl, is employed in the first time of ion substitution or the second time of ion substitution, it still can play a better role in the reinforcement of the glass raw material B, when comparing with the pure nitrate (sodium nitrate or potassium nitrate) salt bath with the same mass.

The technical features of the above embodiments can be combined arbitrarily. In order to make the description concise, not all possible combinations of the technical features in the above embodiments are described. However, as long as the combination of these technical features does not conflict, it should be considered as the scope of the description.

The foregoing is a further detailed description of the present application in connection with specific preferred embodiments, and cannot be considered as that the specific implementation of the present application is limited to these illustrations. It will be apparent to those skilled in the art that any various modifications or substitutions may be made to the present application without departing from the spirit of the invention, and such modifications or substitutions should be considered as falling within the scope of the present application.

The invention claimed is:

1. A salt bath for glass reinforcement including a nitrate with a mass fraction not less than 50% in a molten state, and a metal compound fused into the nitrate, wherein the metal compound contains a same metal element as the nitrate, wherein a mass fraction of the metal element in a molecular formula corresponding to the metal compound is greater than a mass fraction of the metal element in a molecular formula corresponding to the nitrate; wherein the metal compound is selected from at least one of: a metal chloride, a metal peroxide, a metal oxide, a metal phosphate, a metal carbonate, a metal bicarbonate, a metal silicate; wherein a mass fraction of the metal chloride, metal peroxide, metal oxide, metal phosphate, metal carbonate, metal bicarbonate or metal silicate is greater than 11% but smaller than 30%.

2. The salt bath for glass reinforcement according to claim 1, wherein the salt bath for glass reinforcement includes a variety of nitrates and a variety of metal compounds, wherein the variety of nitrates contains same types of the metal element as the variety of metal compounds; and wherein for a same type of the metal element, a mass fraction of the metal element in the molecular formula corresponding to the metal compound is greater than a mass fraction of the metal element in the molecular formula corresponding to the nitrate.

3. The salt bath for glass reinforcement according to claim 1, wherein the metal compound further comprises a metal hydroxide.

4. The salt bath for glass reinforcement according to claim 3, wherein the mass fraction of the metal hydroxides is greater than 0.1% but smaller than 10%.

5. The salt bath for glass reinforcement according to claim 1, wherein the metal element is selected from a first main group element and a second main group element in an element periodic table.

6. The salt bath for glass reinforcement according to claim 1, wherein the salt bath for glass reinforcement further includes an additive that is not fused in the nitrate.

7. The salt bath for glass reinforcement according to claim 1, wherein comprises following components: $KNO_3$ with a mass faction of 89% and KCl with a mass faction of 11%.

8. The salt bath for glass reinforcement according to claim 1, wherein comprises following components: NaCl with a mass faction of 6.60%, KCl with a mass faction of 8.40%, $NaNO_3$ with a mass faction of 38.85%, and $KNO_3$ with a mass faction of 46.16%.

9. The salt bath for glass reinforcement according to claim 1, wherein comprises following components: NaCl with a mass faction of 9.70%, KCl with a mass faction of 5.30%, $NaNO_3$ with a mass faction of 56.32%, and $KNO_3$ with a mass faction of 28.68%.

10. The salt bath for glass reinforcement according to claim 1, wherein comprises following components: NaCl with a mass faction of 11.38%, KCl with a mass faction of 3.62%, NaNO$_3$ with a mass faction of 65.54%, and KNO$_3$ with a mass faction of 19.47%.

11. The salt bath for glass reinforcement according to claim 1, wherein comprises following components: NaCl with a mass faction of 13.14%, KCl with a mass faction of 1.86%, NaNO$_3$ with a mass faction of 75.09%, and KNO$_3$ with a mass faction of 9.91%.

12. The salt bath for glass reinforcement according to claim 1, wherein comprises following components: NaCl with a mass faction of 15%, and NaNO$_3$ with a mass faction of 85%.

13. The salt bath for glass reinforcement according to claim 1, wherein comprises following components: Na$_2$O$_2$ with a mass faction of 1.45%, K$_2$O$_2$ with a mass faction of 2.05%, Na$_2$O with a mass faction of 0.20%, K$_2$O with a mass faction of 0.30%, NaCl with a mass faction of 4.84%, KCl with a mass faction of 6.16%, NaNO$_3$ with a mass faction of 38.85%, and KNO$_3$ with a mass faction of 46.16%.

14. The salt bath for glass reinforcement according to claim 1, wherein comprises following components: Na$_2$O$_2$ with a mass faction of 1.80%, K$_2$O$_2$ with a mass faction of 1.70%, Na$_2$O with a mass faction of 0.25%, K$_2$O with a mass faction of 0.25%, NaCl with a mass faction of 5.95%, KCl with a mass faction of 5.05%, NaNO$_3$ with a mass faction of 47.43%, and KNO$_3$ with a mass faction of 37.57%.

15. The salt bath for glass reinforcement according to claim 1, wherein comprises following components: Na$_2$O$_2$ with a mass faction of 2.18%, K$_2$O$_2$ with a mass faction of 1.32%, Na$_2$O with a mass faction of 0.30%, K$_2$O with a mass faction of 0.20%, NaCl with a mass faction of 7.12%, KCl with a mass faction of 3.88%, NaNO$_3$ with a mass faction of 56.32%, and KNO$_3$ with a mass faction of 28.68%.

16. The salt bath for glass reinforcement according to claim 1, wherein comprises following components: Na$_2$O$_2$ with a mass faction of 2.59%, K$_2$O$_2$ with a mass faction of 0.91%, Na$_2$O with a mass faction of 0.36%, K$_2$O with a mass faction of 0.14%, NaCl with a mass faction of 8.34%, KCl with a mass faction of 2.66%, NaNO$_3$ with a mass faction of 65.54%, and KNO$_3$ with a mass faction of 19.47%.

17. The salt bath for glass reinforcement according to claim 1, wherein comprises following components: Na$_2$O$_2$ with a mass faction of 3.03%, K$_2$O$_2$ with a mass faction of 0.47%, Na$_2$O with a mass faction of 0.43%, K$_2$O with a mass faction of 0.07%, NaCl with a mass faction of 9.64%, KCl with a mass faction of 1.36%, NaNO$_3$ with a mass faction of 75.09%, and KNO$_3$ with a mass faction of 9.91%.

18. The salt bath for glass reinforcement according to claim 1, wherein comprises following components: Na$_2$O$_2$ with a mass faction of 3.50%, Na$_2$O with a mass faction of 0.50%, NaCl with a mass faction of 11%, and NaNO$_3$ with a mass faction of 85.00%.

* * * * *